United States Patent
Zhu (10) Patent No.: US 10,752,019 B2
(45) Date of Patent: Aug. 25, 2020

(54) PRINT SYSTEM, PRINTED MATTER CREATING DEVICE, AND NON-TRANSITORY COMPUTER-READABLE RECORDING MEDIUM THEREFOR

(71) Applicant: BROTHER KOGYO KABUSHIKI KAISHA, Aichi (JP)

(72) Inventor: Feng Zhu, Aichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/362,476

(22) Filed: Mar. 22, 2019

(65) Prior Publication Data

US 2019/0375214 A1 Dec. 12, 2019

(30) Foreign Application Priority Data

Jun. 8, 2018 (JP) .................................. 2018-110441

(51) Int. Cl.
B41J 3/407 (2006.01)
B41J 3/44 (2006.01)
G06F 3/12 (2006.01)

(52) U.S. Cl.
CPC ................ *B41J 3/4075* (2013.01); *B41J 3/44* (2013.01); *G06F 3/1204* (2013.01)

(58) Field of Classification Search
CPC .......... B41J 3/4075; B41J 3/44; G06F 3/1204
USPC ....................................................... 358/1.15
See application file for complete search history.

(56) References Cited

U.S. PATENT DOCUMENTS

| 2008/0291484 | A1* | 11/2008 | Hoshino | H04N 1/0035 |
| | | | | 358/1.15 |
| 2009/0174896 | A1* | 7/2009 | Nakamura | G06F 3/1207 |
| | | | | 358/1.15 |
| 2010/0253727 | A1* | 10/2010 | Nishioka | B41J 3/4071 |
| | | | | 347/14 |
| 2015/0277831 | A1* | 10/2015 | Kuranoshita | G06F 3/1288 |
| | | | | 358/1.15 |
| 2016/0009105 | A1* | 1/2016 | Yamada | B41J 5/30 |
| | | | | 347/6 |

(Continued)

FOREIGN PATENT DOCUMENTS

| JP | 2006-309473 A | 11/2006 |
| JP | 2016-173654 A | 9/2016 |

*Primary Examiner* — Allen H Nguyen
(74) *Attorney, Agent, or Firm* — Kenealy Vaidya LLP (57) ABSTRACT

A print system includes the operation terminal and a printer communicatably connected with each other. A non-transitory computer-readable recording medium for the operation terminal is provided with a template storage configured to store template data containing object data defining a print format. The recording medium stores instructions which cause, when executed, the printer to perform receiving a user input of selecting a plurality of pieces template data from among a plurality of pieces of template data stored, in advance, in the template storage as selected template data, generating same-content associating data indicating pieces of object data included in the plurality of pieces of selected template data and set with the particular print content, generating template set management data configured to storing the selected template data and the same-content associated data, and storing the template set management data in the template storage.

10 Claims, 8 Drawing Sheets

(56) References Cited

U.S. PATENT DOCUMENTS

| | | | |
|---|---|---|---|
| 2016/0162223 A1* | 6/2016 | Tamagawa | G06F 3/1213 358/1.15 |
| 2018/0250974 A1* | 9/2018 | Sato | B41J 3/4075 |

\* cited by examiner

PRINT SYSTEM, PRINTED MATTER CREATING DEVICE, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2018-110441 filed on Jun. 8, 2018. The entire subject matter of the application is incorporated herein by reference.

BACKGROUND

Technical Field

The present disclosures relate to a printed matter creating device configured create a printed matter with use of templated data, and non-transitory computer-readable recording medium for the printed matter creating program.

Related Art

There has been known a method of creating a printed matter configured to use a template including objects each of which defines a print format (e.g., a size and a location of a print area, a font (size and type) to be used and the like). According to such a conventional method, by setting a print content for each object (e.g., by inputting a text string to be printed corresponding to each object), the print content is printed on a printing medium in accordance with the print format defined by the object.

SUMMARY

When a plurality of printed matters are created, in practice, there is a case where a plurality of pieces of template data respectively corresponding to the plurality of printed matters are treated as a set of template data (hereinafter, referred to as a template data set), and arbitrary ones of a plurality of pieces of object data included in the plurality of pieces of template data in the template set are selected such that same print content data is shared among the selected object data. For example, when the same print content data is set to a plurality of pieces of object data respectively included in a plurality of pieces of template data of the template data set, the plurality of printed matters which are printed in accordance with the template data set have portions indicating the same print content, respectively. It is noted that the formats of the same print content of the plurality of printed matters may be different depending on the definition of the formats of the plurality of pieces of objected data, respectively.

Conventionally, a management of such template data set, which includes a plurality of pieces of the template data, must be performed manually (i.e., not automatically). Further, print content data for each piece of the object data must be set individually, and a printing operation must be performed for each piece of the template data. Therefore, in such a configuration, the print content data to be shared among the plurality of pieces of object data respectively included in the plurality of pieces of template data should be set individually. Such repetitive and redundant operations are very troublesome and inefficient work for the user.

According to aspects of the present disclosures, there is provided a non-transitory computer-readable recording medium for an operation terminal of a print system including the operation terminal and a printer communicatably connected with each other, the printer being provided with a conveyer configured to convey a printing medium, a template storage configured to store template data containing object data defining a print format, a printing device configured to perform printing based on particular print content data and the print format defined by the object data, and a controller configured to control the conveyer and the printing device. The recording medium stores instructions which cause, when executed by the controller, the printer to perform a selection process of receiving a user input of selecting a plurality of pieces template data from among a plurality of pieces of template data stored, in advance, in the template storage as selected template data, an association process of generating same-content associating data indicating pieces of object data included in the plurality of pieces of selected template data and set with the particular print content, a management process of generating template set management data configured to storing the selected template data and the same-content associated data, and storing the template set management data in the template storage.

According to aspects of the present disclosures, there is provided a printed matter creating device, including a conveyer configured to convey a printing medium, a printing device configured to perform printing based on print data on the printing medium conveyed by the conveyer, a template storage configured to store template data including object data defining print format, a particular print content being printed by the printing device in accordance with the print format defined by the object data, and a controller configured to control the conveyer and the printing device. The controller is configured to perform an obtaining process of obtaining template set management data containing a plurality of pieces of selected template data which are arbitrarily selected from a plurality of pieces of template data which have been stored, in advance, in the template storage, and same-content associating data associating arbitrarily selected plurality of pieces of object data contained in the plurality of pieces of selected template data with each other, the arbitrarily selected plurality of pieces of object data being set with a same print content data. The controller is further configured to perform a printed matter creating process of controlling the conveyer and the printing device based on the selected template data and the same-content associating data contained in the template set management data obtained in the obtaining process to create a printed matter on which printing corresponding to each of the plurality of pieces of selected template is performed.

According to aspects of the present disclosures, there is provided a print system including an operation terminal and a printer communicatably connected with each other. One of the operation terminal and the printer includes a storage configured to store a plurality of pieces of template data, a user interface, and a controller. The controller being configured to receive a user input, through the user interface, of information indicating selected pieces of template data from among the plurality of pieces of template data stored in the storage as selected template data, receive a user input, through the user interface, of a number of prints of a printed matter corresponding to each piece of the selected template data, receive a user input, through the user interface, of information indicating a plurality of pieces of object data to which a same print content is to be set from among the plurality of pieces of object data contained in the selected template data, receive a user input, through the user interface, of print content data which is to be shared by the plurality of pieces of object data as the same print content, and generate template set management data including same-content associating data indicating the selected pieces of object data and the print content data. When the controller is of the operation terminal, the controller transmits the template set management data to the printer, a controller of the printer performing printing based on the template set management data transmitted from the controller of the operation terminal. Further, when the controller is of the printer, the controller performs printing based on the template set management data as generated.

DETAILED DESCRIPTION OF THE EMBODIMENT

Hereinafter, referring to the accompanying drawings, a print system 1 according to an illustrative embodiment will be described.

<System Configuration>

Figure 1:
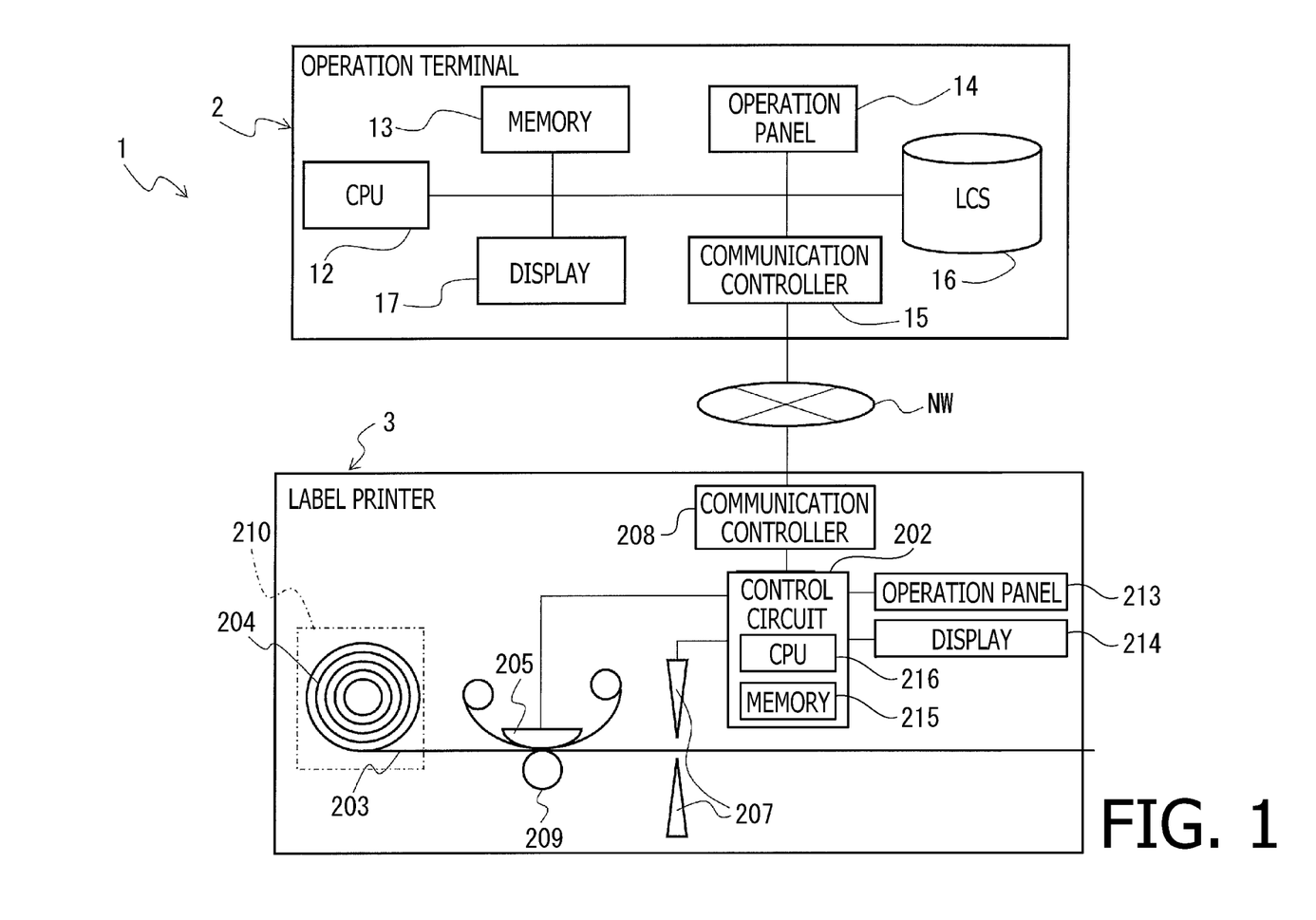
FIG. 1 is a functional block diagram of a print system, which is configured to execute a printed matter creating process and includes an operation terminal and a label printer according to an illustrative embodiment of the present disclosures.

FIG. 1 is a functional block diagram schematically showing functional configurations of the print system 1, which is configured to execute a printed matter creating process. According to the illustrative embodiment, the print system 1 includes an operation terminal 2 (e.g., a personal computer) and a label printer 3 which is connected to the operation terminal 2 through a communication network NW (e.g., a LAN) so that the operation terminal 2 and the label printer 3 can exchange information with each other.

The label printer 3 (which is an example of a printed matter creating device) exchanges various pieces of information and instruction signals with the operation terminal 2. In accordance with user operations on the operation terminal 2 side, the label printer 3 creates a printed label (an example of a printed matter) on which user-desired characters and/or figures are printed.

The operation terminal 2 has a CPU 12, a memory 13 including a RAM and a ROM, an operation panel 14 through which user instructions and information are input, a display 17 configured to display various pieces of information and messages, a communication controller 15 configured to control exchange of information and signals with the label printer 3, and a large-capacity storage (LCS) 16 configured to store various programs including a program for a management data generating process (described later) and a plurality of pieces of template data (described later).

The CPU 12 performs, in accordance with programs which have been stored, in advance, in the ROM of the memory 13 or the LCD 16, various processes and exchange of various instruction signals and/or information, with the label printer 3 with use of the RAM configured to temporarily storing data/information.

As shown in FIG. 1, the label printer 3 includes a tape roll holder 210 configured to detachably hold a tape roll 204 which is formed by winding a printing tape 203 (the print tape 203 being an example of a printing medium). It is noted that the printing tape 203 of the tape roll 204 is actually wound spirally. In FIG. 1, however, the printing tape 203 of the tape roll 204 is indicated in a simplified manner and drawn as co-centric circles indicated by solid lines. Further, the tape roll 204 may be accommodated in a cartridge and the cartridge may be detachably attached on the tape holder 210.

The label printer 3 further includes a print head 205 (which is an example of a printing section) configured to perform printing images on the printing tape 203 drawn out of the tape roll 204, a cutter 207 configured to cut out a printed portion of the tape 203 to create a printed label having a particular length. The label printer 3 further includes a conveying device 209 (which is an example of a conveyer) arranged to face the print head 205 and controlled by a control circuit 202 to convey the tape 203 drawn out of the tape roll 204, an operation panel 213 through which instructions and information are input by the user, and a display 214 configured to display various information and messages.

The control circuit 202 is provided with a CPU 216 (which is an example of a controller) and is connected to the communication controller 15 of the operation terminal 2 through a communication controller 208 and the communication network NW. Accordingly, the label printer 3 is capable of exchanging information with the operation terminal 2. It is noted that the control circuit 202 has a memory 215 (which is an example of a template storage) storing template data and template set management data, which will be described later.

<Characteristic Features of Embodiment>

One of characteristic features of the print system 1 is to manage a plurality of print labels having different print contents and/or print formats as one print label set, to generate and set of the management data, and simply perform automatic creation of a plurality of print labels based on the management data. As a prerequisite, it is assumed that the label printer 3 is configured to perform a printing process of the print label based on the print format defined by so-called template data (print data), and a plurality of pieces of template data which have been generated to have respective contents are stored in the memory 215 of the label printer 3. In the following description, contents of template set management data used to manage and create the print label set above, a creating process of the template set management data, and a generating process of the print label will be described in detail.

<Print Label Set>

Figure 2:
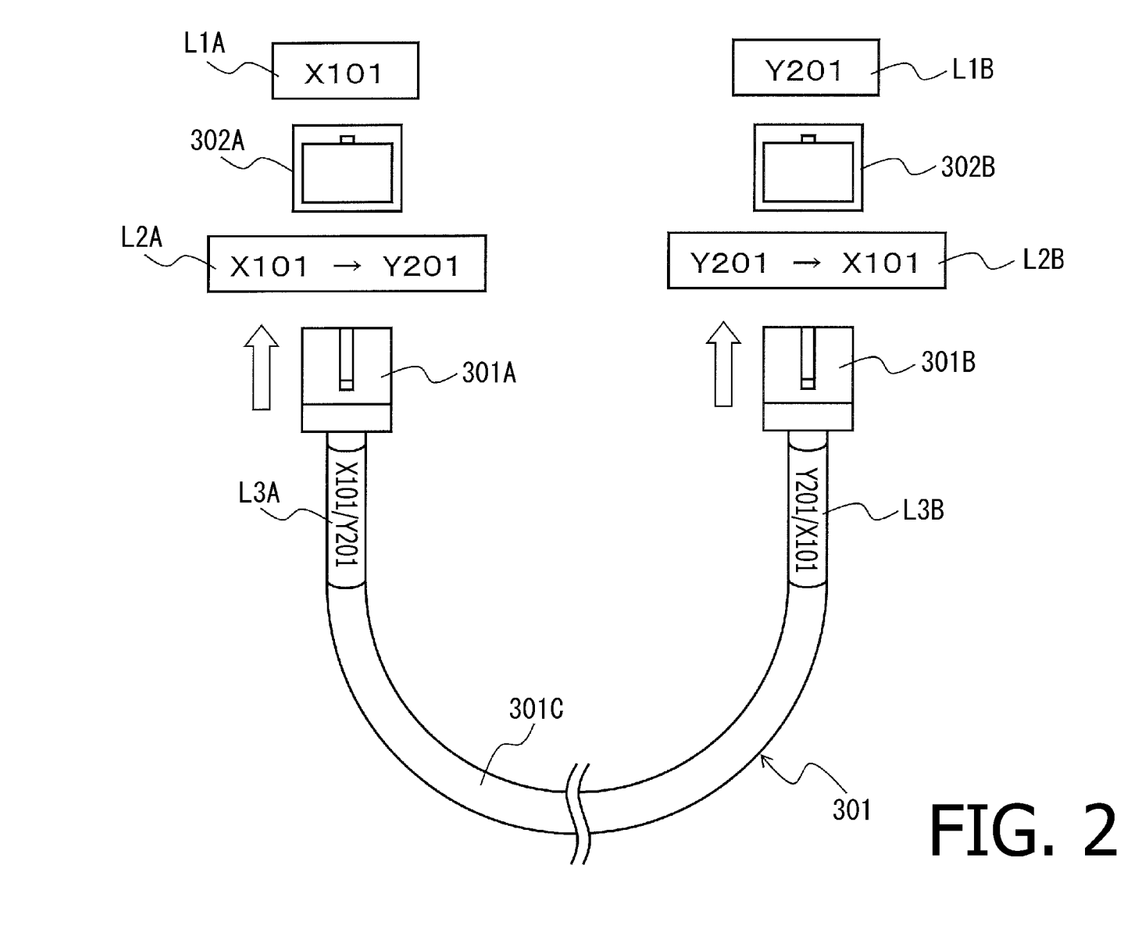
FIG. 2 shows an example of a utilization form of a print label set according to the illustrative embodiment of the present disclosures.

Firstly, the print label set which is managed and created based on the template set management data will be described. FIG. 2 shows an example of a utilization form of the print label set. The example shown in FIG. 2 illustrates a configuration in which plugs 301A and 301B at both ends of a single cable 301 are respectively connected to two different connectors 302A and 302B and three print labels are adhered to portions around each of the two connections.

At positions on upper sides, in FIG. 2, on a casing of the operation terminal 2 with respect to the connectors 302A and 302B, connector ID labels L1A and L1B, on which identification numbers (in the example shown in FIG. 2, "X101" and "Y201") of the corresponding connectors 302A and 302B are printed, are adhered, respectively. Further, at positions on lower sides, in FIG. 2, on the casing of the operation terminal 2 with respect to the connectors 302A and 302B, connector connection relation labels L2A and L2B are adhered. On the connector connection relation labels L2A and L2B, identification numbers of the corresponding connectors 302A and 302B are arranged on left sides thereof, a symbol "→" is arranged at central portions thereof, and identification numbers of the connectors 302A and 302B, which are connection destinations through the cable 301, are arranged on right sides thereof, respectively. Thus, according to the example shown in FIG. 2, on the connector connection relation label L2A, character strings "X101", "→" and "Y201" are printed as "X101→Y201". Further, on the connector connection relation label L2B, character strings "Y201", "→" and "X101" are printed as "Y201→X101".

Further, on portions of the cable 301C around the plugs 301A and 301B, plug connection relation labels L3A and L3B are adhered, respectively. The plug connection relation labels L3A and L3B are adhered on a main body of the cable 301C so as to be wound therearound in a circumferential direction of the main body of the cable 301C. On the plug connection relation labels L3A and L3B are configured such that the identification numbers of the connectors 302A and 302B to which the plugs 301A and 301B are connected are arranged on left sides, a symbol "/" is arranged at central parts and the identification numbers of the connectors 302B and 302A to which the other plugs 301B and 301A are connected are arranged on right sides thereof. In the example shown in FIG. 2, a character string "X101/Y201" and a character string "Y201/X101" are printed on the plug connection relation labels L3A and L3B, respectively. It is further noted that the plug connection relation labels L3A and L3B are wound on the main body 301C of the cable 3 such that the identification number of the connectors 302A and 302B to which the plugs 301A and 301B are connected are arranged on sides closer to the plugs 301A and 301B. Further, the plug connection relation labels L3A and L3B are wound on portions of the main body 301C of the cable 301 next to the plugs 301A and 301B, respectively, such that the character strings printed on the plug connection relation labels L3A and L3B are correctly oriented when the plugs 301A and 301B are arranged on the left-hand side and the portions of the main body 301C on which the connection relation labels L3A and 13B are arranged to extend in a horizontal direction (i.e., a direction extending from the left-hand side to the right-hand side in FIG. 2).

In a configuration where the two connectors 302A and 302B are connected with a single cable 301, three kinds of print labels L1A-L3B (i.e., six print labels) are adhered around each of the connectors 302A and 302B (i.e., around each of the plugs 301A and 301B). With this configuration, simply by visually recognizing one of the two connectors 302A and 302B, the connection relationship with the other connectors 302A and 302B through the cable 301 can be recognized easily. Further, in a case where the cable 301 is once removed and then connected again, the same connection relationship can be restored easily. Such a configuration is particularly useful when the number of connectors and cables such as the connectors 302A and 302B, and the cable 301 is relatively large.

A utilization form of the above-mentioned six print labels L1A-L3B is used for each configuration (i.e., a connector connection configuration) through one cable 301. According to the illustrative embodiment, the plurality of print labels L1A-L3B which are used as one set of labels will be referred to as a print label set. For example, in a situation where a plurality of sets of connectors 302A and 302B are connected with use of a plurality of cables 301, the print label sets as many as the plurality of cables 301 are necessary.

According to the print label set shown in FIG. 2, corresponding to a combination of the connectors 302A and 302B, and the plugs 301A and 301B, three kinds of print labels L1-L3, that is, the connector ID labels L1 (i.e., L1A and L1B), the connector connection relation labels L2 (i.e., L2A and L2B), and the plug connection relation labels L3 (i.e., L3A and L3B) are necessary. The three kinds of print labels L1-L3 have different print formats, respectively. Further, the three kinds of print labels L1-L3 become necessary for each of the two connectors 302A and 302B (or, the two plugs 301A and 301B). Therefore, corresponding to the two connectors 302A and 302B (or, the two plugs 301A and 301B), six print labels L1A, L1B, L2A, L2B, L3A and L3B are treated as one set of labels.

It is noted, however, the most parts of minimum unit of the print contents (e.g., texts "X101" and "Y201") printed on respective print labels in the one print label set overlap the other print contents. Among the above-described three kinds of print labels L1-L3, only arrangements of the print contents within print areas on the print labels, points (i.e., sizes) and print formats (e.g., styles) are different, while between the print labels of the same type, only difference is that opposite print contents are printed. In such a print label set, when all the six print labels are printed, if the print contents and the print formats for respective print labels are set individually, a lot of overlapping setting jobs becomes necessary, which is very troublesome and inefficient.

In such a case, according to a conventional technique, so-called template data which collectively contains object data defining the arrangement, the point (size), the style and the like for each of print contents (on a label basis) is used. Therefore, formulation of the print format on the print label basis can be realized (described in detail later). According to the present disclosures, a plurality of print labels respectively corresponding to a plurality of different pieces of template data are treated as one print label set, and the object data included in the plurality of pieces of template data in the print label set are associated with each other in accordance with arbitrary combinations, thereby the same print content data being shared among the plurality of pieces of object data which are associated with each other.

According to the present embodiment, the plurality of pieces of template data used in one print label set are referred to as selected template data. Further, among the plurality of pieces object data included in the plurality of pieces of selected template data, a combination of the object data sharing the same print content is referred to as same-content associating data. Data containing the selected template data and the same-content associating data is generated as template set management data, and a data generating process to generate the print label set is performed based on the template set management data.

<Template Set Management Data>

Figure 3:
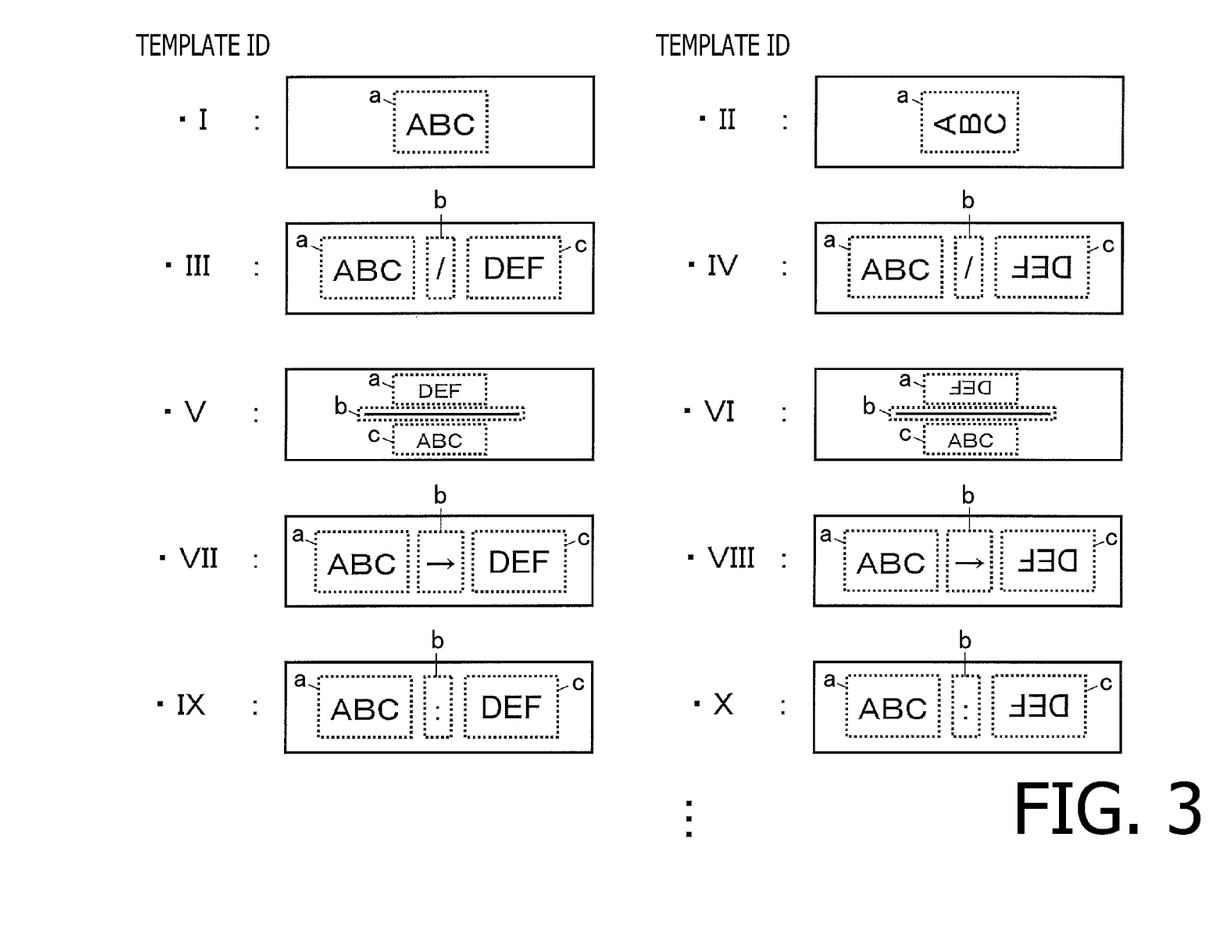
FIG. 3 schematically shows an example of a template data group including a plurality of pieces of template data used for creating the print label set shown in FIG. 2.

As described above, in a memory 215 provided to the label printer 3 according to the present embodiment, a plurality of pieces of template data have been stored in advance. FIG. 3 schematically shows an example of the template data group including the template data necessary for creating the print label set shown in FIG. 2.

In FIG. 3, ten pieces of template data I, II, IX and X are schematically shown. Each piece of the template data I-X contains one or a plurality of pieces of object data a-c. The object data defines the print format of print content data which is set individually corresponding to respective pieces of the object data, that is, the arrangement within the print area of the print label (print position), the point (print size), the style (bold, italic, arrangement direction, orientation direction, reversal in up/down or right/left direction and the like). Further, the object data in this example includes arbitrary object data and intrinsic object data. The arbitrary object data is data of which the user can set the print content data arbitrarily (e.g., a character string indicated as common text data "ABC", "DEF" in FIG. 3). The intrinsic object data is data defining the print content unchangeably set by the template data (e.g., the object data b of each of template data III-X in FIG. 3).

The user may designate arbitrary template data, and arbitrarily set the print content data for each piece of the arbitrary object data included in the designated template data, thereby the print labels having the same print formats but different print contents being created. It is noted that the template ID's (i.e., I-X) in FIG. 3 are identification information of the template data.

Figure 4:
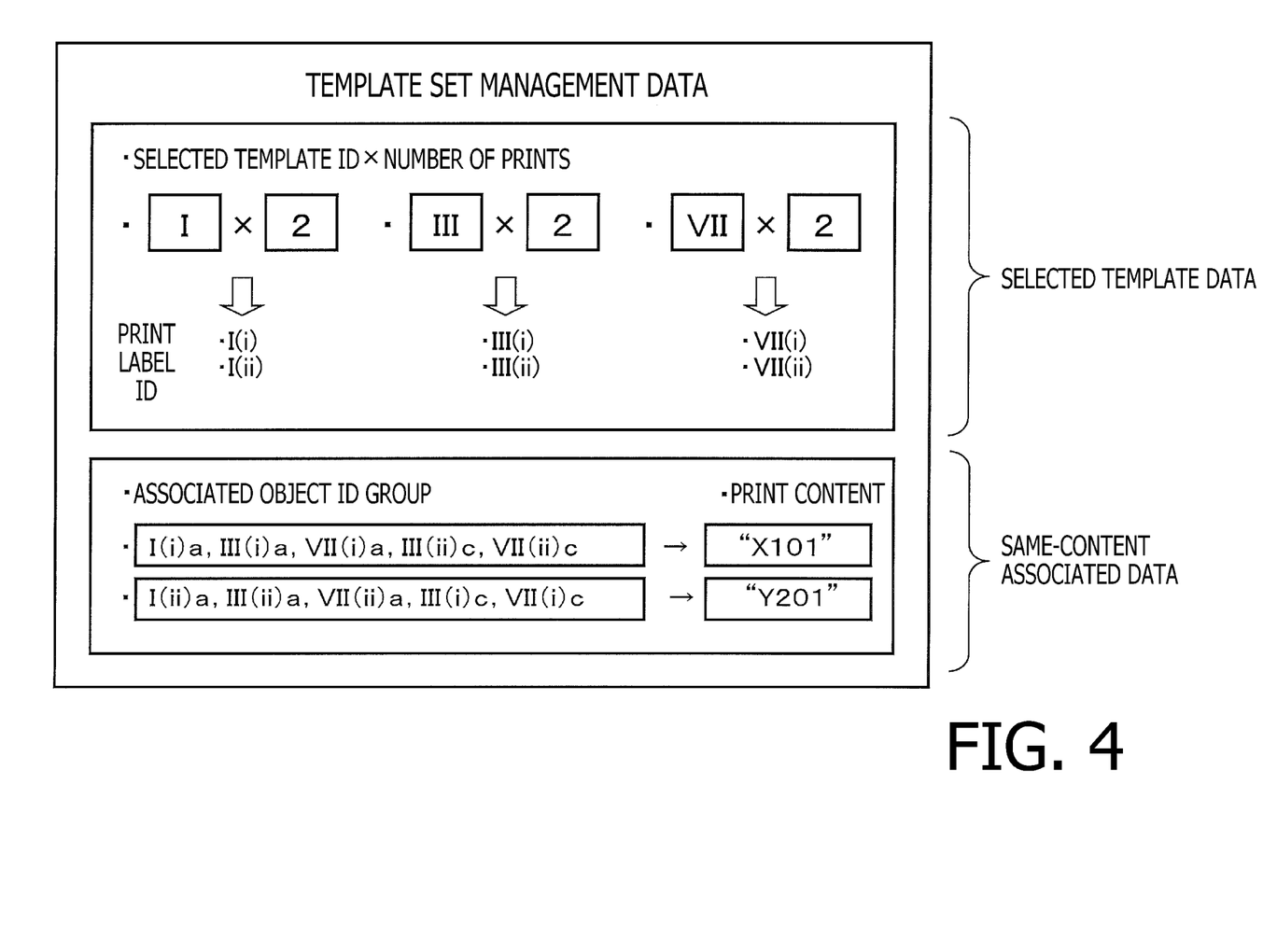
FIG. 4 schematically shows template set management data used to create the print label set shown in FIG. 2.

When, for example, the print label set shown in FIG. 2 is created, the template set management data as shown in FIG. 4 is generated. The template set management data generally includes the selected template data and the same-content associating data.

In the selected template data, the identification information of the template data necessary for creating the print label set managed by the template set management data is recorded as the selected template ID's, and further, the number of the print labels corresponding to each of the selected template ID's is also recorded.

The selected template ID's and the numbers thereof are to be set arbitrarily by the user. When all of the selected template ID's and the numbers thereof are set, the total number of the print labels and the identification information thereof (i.e., "print label ID" in FIG. 3) included in the print label set are automatically determined and recorded. It is noted that, in this example, the print label ID is expressed by a combination of the selected template ID (in FIG. 3, "I", "III" and "VII") and identification information corresponding to the number of prints of each label (i.e., "(i)", "(ii)" in FIG. 3). For example, "I(i)" indicates the first label of the "template I", while "I(ii)" indicates the second label of the "template I".

In the same-content associating data, an associated object ID group and the print content data (in FIG. 2, "X101" and "Y201") corresponding to the associated object ID group are recited. The associated object ID group lists of ID's of the pieces of arbitrary object data sharing the same print content. The associated object ID group and the print content data corresponding thereto are data the user arbitrarily sets. In this example, the identification information of the objects listed in the associated object ID group (i.e., object ID) is expressed by a combination of the selected template ID's (in FIG. 3, "I", "III" and "VII") and the identification number of respective print labels corresponding to the number of prints (in FIG. 4, "(i)", "(ii)") and the identification information of the object data included in each template corresponding to each of the selected template ID's (in FIG. 3, "a" and "c"). Thus, the identification information of the objects listed in the associated object ID group is expressed, for example, as "I(i)a", "I(ii)a" and the like. For example, according to the embodiment, indication "I(i)a" indicates the object "a" of the template "I" on the first label ("i"), while indication "I(ii)a" indicates the object "a" of the template "I" on the second label ("ii").

With use of the template set management data generated as above, all the pieces of selected template data utilized for all the print labels included in the print label set, and the print content data of respective pieces of the object data included in the selected template data are grasped.

According to the present embodiment, the management data generating process for creating the template set management data can be executed either of the operation terminal 2 and the label printer 3. Then, the label printer 3 receives the template set management data from the operation terminal 2 or creates the same by itself, and creates each print label of the print label set.

<Process of Generating Template Set Management Data>

Figure 5:
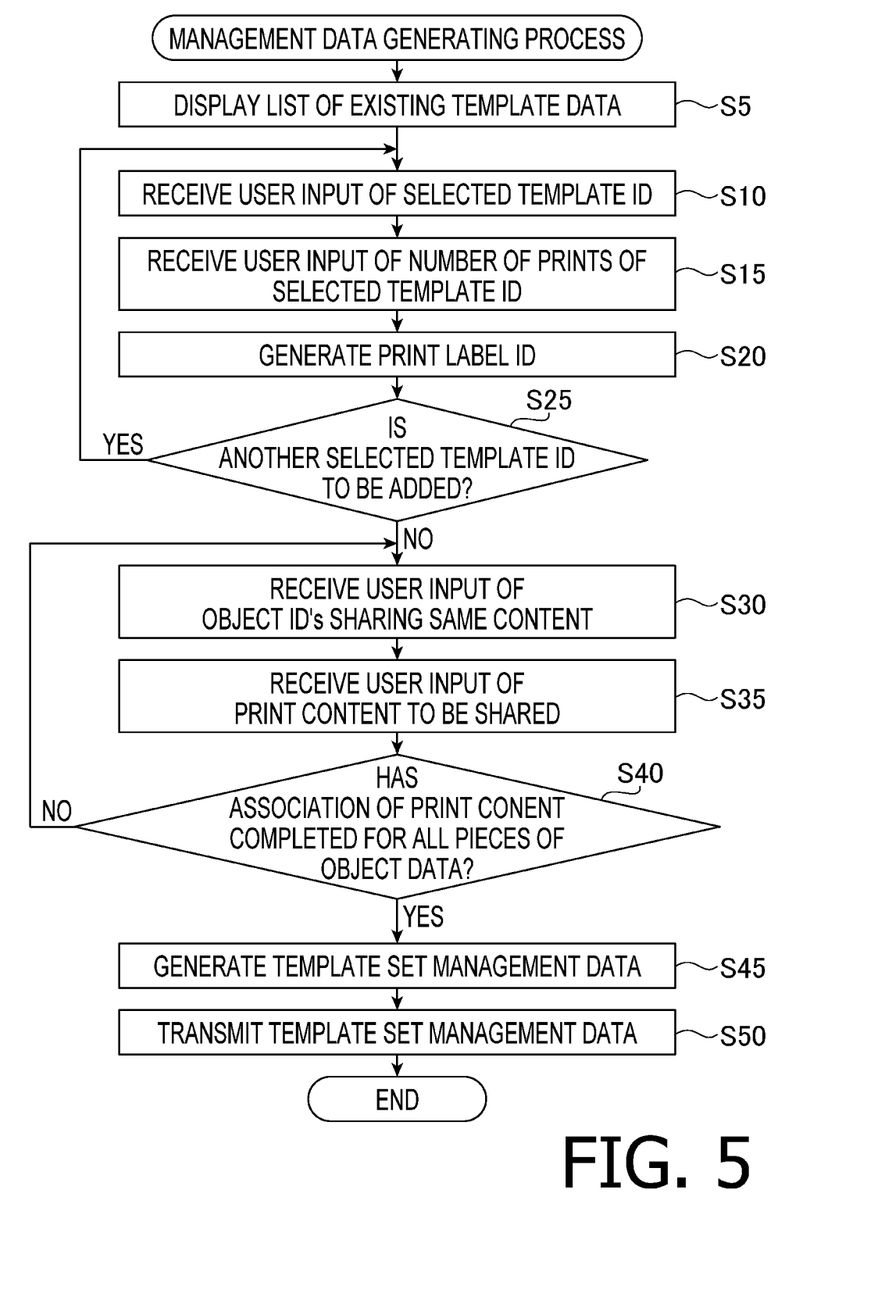
FIG. 5 is a flowchart illustrating a management data generating process executed by a CPU of the operation terminal.

FIG. 5 is a flowchart illustrating a management data generating process executed by the CPU 12 of the operation terminal 2 to realize a generating process of the template set management data. It is assumed that all the pieces of template data stored in the memory 215 of the label printer 3 are also stored in the LCS 16 of the operation terminal 2 in advance. Further, the process shown in FIG. 5 is started when the user performs an operation to create the template set management data on the operation terminal 2 side.

In S5, the CPU 12 retrieves all the pieces of template data from the LCS 16 and displays the same on the display 17 as a list.

Next, the CPU 12 proceeds to S10 in which the CPU 12 receives a user input indicating of the template data to be selected from among ones in the list displayed in S5 as selected template data (i.e., selected template ID's). A process of S10 is an example of a selection process.

Then, in S15, where the CPU 12 receives a user input of the number of prints of labels corresponding to the selected template data ID is obtained in S10. It is noted that a process of S15 is an example of the number of prints setting process.

Then, the CPU 12 proceeds to S20 and generates the print label ID based on the selected template ID and the number of prints thereof.

Next, in S25, the CPU 12 determines whether a user instruction to add another piece of selected template data has been received. When it is determined that the instruction to add another selected template data has been received (S25: YES), the CPU 12 returns to S10 and repeats the same process.

Alternatively, when addition of the selected template data has not been instructed (S25: NO), the CPU 12 proceeds to S30.

In S30, the CPU 12 receives a user operation of inputting all the object ID's of the corresponding object ID group sharing the same print content. A process of S30 is an example of an example of an association process.

The CPU 12 proceeds to S35 and receives a user input of the print content data corresponding to the associated object ID group input in S30. A process of S35 is an example of a content setting process.

In S40, the CPU 12 determines whether inputting of the object ID in any of the associated object ID groups with respect to all the arbitrary object data included in all the selected template data has been completed. When there remains the arbitrary object data of which object ID has not been input in any of the associated ID group (S40:NO), the CPU 12 returns to S30 and the similar process is repeated with respect to the object ID which has not been associated with any of the other object ID's. It is noted that there could be a case where a piece of object data is not associated with any other pieces of object data. In such a case, the associated object ID group contains only one object ID.

When the association has been completed with respect to all the arbitrary object data (S40: YES), the CPU 12 proceeds to S45.

In S45, the CPU 12 generates the template set management data based on the selected template data generated in the process of S10-S40 and the same-content associating data. The process of S45 is an example of a management process.

Next, in S50, the CPU 12 transmits the template set management data generated in S45 to the label printer 3. The process in S50 is an example of a transmitting process. After execution of S50, the CPU 12 terminates the management data generating process.

It is noted that an entire process of the management data generating process is an example of a printed matter creating process. Further, as mentioned above, the management data generating process may be executed by a CPU 216 provided to the control circuit 202 of the label printer 3. In such a case, the template data is obtained from the memory 215 in S5, and the template set management data is stored in the memory 215 in S50.

<Print Label Set Creating Process>

Figure 6:
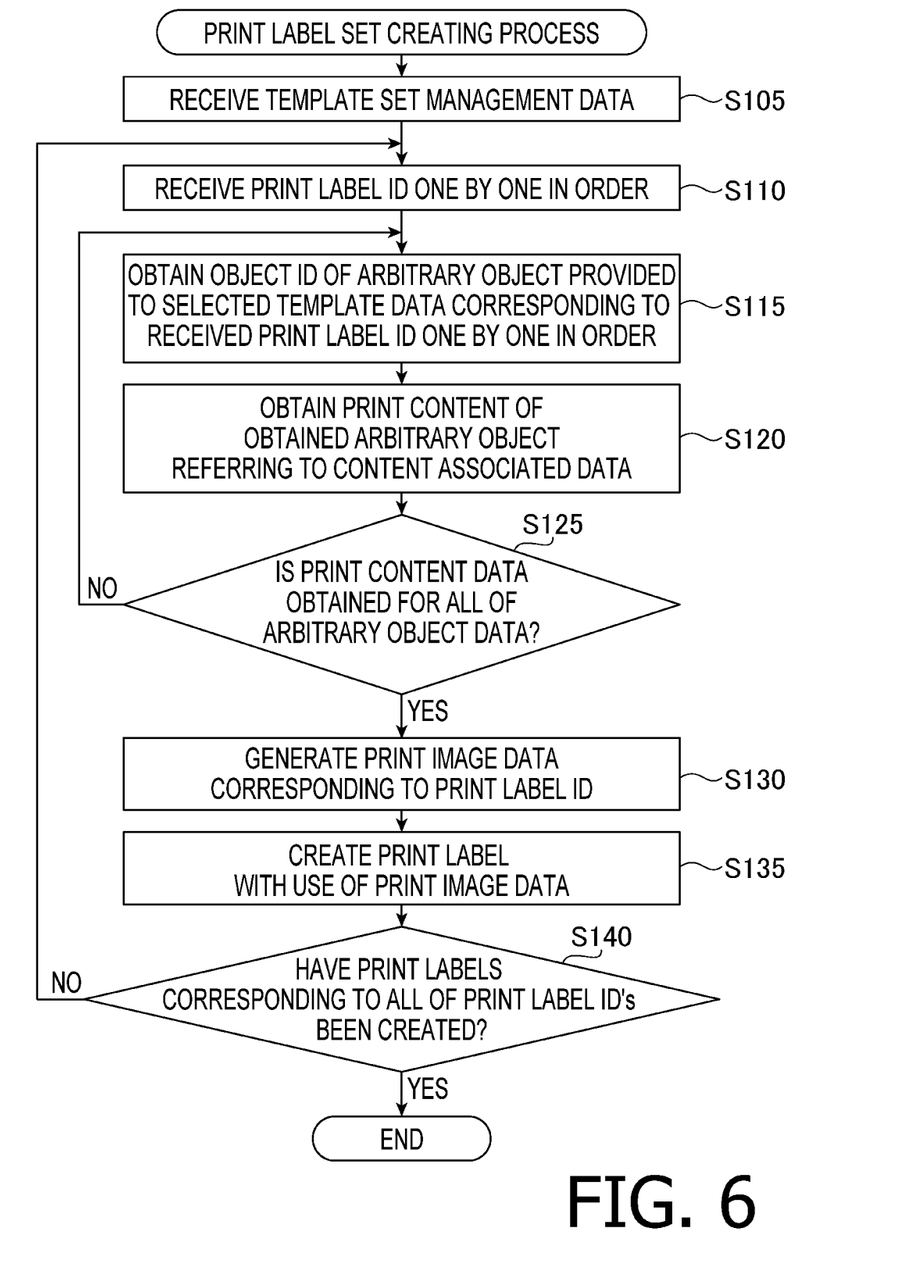
FIG. 6 is a flowchart illustrating a print label set creating process executed by the CPU of the label printer.

FIG. 6 shows an example of a print label set creating process which is executed by the CPU 216 of the control circuit 202 of the label printer 3. The print label set creating process is for creating the print label set with use of the template set management data. The process shown in FIG. 6 is started when the label printer 3 is operated by the user to create the print label set.

In S105, the CPU 216 receives the template set management data from the operation terminal 2. It is noted that, when the label printer 3 uses the template set management data created by the label printer 3 itself, the CPU 216 receives the template set management data designated by the user from the memory 21. The process in S105 is an example of an obtaining process.

Then, the CPU 216 proceeds to S110 and obtains the print label ID's recorded in the selected template data contained in the template set management data one by one (e.g., in the order of numbers, i, ii, iii, . . . ).

Then, in S115, the CPU 216 obtains the object ID's of the arbitrary object data contained in the selected template data corresponding to the print label ID's obtained in S110 one by one (e.g., in the alphabetical order of a, b, c, . . . ).

Next, the CPU 216 proceeds to S120 and obtains the print content data corresponding to the associated object ID group to which the object ID obtained in S115 belongs, referring to the same-content associating data.

Then, the process proceeds to S125 and the CPU 216 determines whether the print content data is obtained for all the corresponding arbitrary object data contained in the selected template data corresponding to the print label ID's obtained in S110. When there are pieces of the arbitrary object data for which the print content data has not been obtained (S125: NO), the CPU 216 returns to S115 and the similar process is repeated.

When the print content data has been obtained for all the pieces of arbitrary object data (S125: YES), the CPU 216 proceeds to S130.

In S130, the CPU 216 generates entire print image data to be printed out within the print area of the print label corresponding to the current print label ID. That is, the CPU 216 develops the print content data of each of the arbitrary object data and the intrinsic object data, based on the selected template data corresponding to the print label ID and the print formats defined by respective pieces of the object data contained in the selected template data, to generate the entire print image data.

Next, the CPU 216 proceeds to S135 and controls the conveyer 209, the print head 205 and the cutter 207, based on the print image data generated in S130, to create the print label corresponding to the print label ID.

Next, the CPU 216 proceeds to S140 and determines, with respect to all the print label ID's recorded in the selected template data of the template set management data, whether the print labels have been created. When there is a print label ID for which the print label has not been created (S140: NO), the CPU 216 returns to S110 and repeats the similar processes as described.

When it is determined that the print labels corresponding to all the print label ID's have been created (S140: YES), the CPU 216 terminates the print label set creating process.

It is noted that the process of steps 105-S140 is an example of a printed matter creating process.

As described above, in the management data generating process, the template set management data, which is different from the template data, is created and transmitted to the label printer 3. That is, after the management data generating process is started, the user's selection, from the plurality of pieces of template data stored, in advance, in the memory 215 or the LCS 16, of arbitrary (e.g., user-desired) ones as the selected template data is received in S10. Thereafter, in S35, the CPU 12 generates the same-content associating data indicating to which objects, among the plurality of pieces of selected template data, the same print content data are associated. Then, in S45, the CPU 12 generates the template set management data recording the selected template data and the same-content associating data, and transmits the same to the label printer 3 (S50).

As above, a set including different pieces of selected template data can be managed with use of a single piece of template set management data. Further, a combination of the objects sharing the same print content can also be recorded in the template set management data. As a result, the operation terminal 2 which has generated the template set management data, or the label printer 3 which has received the template set management data can automatically grasp which pieces of the selected template data in the template set management data are used and which pieces of the object data are selected to share the same print content data. Therefore, by setting the content once for each kind of the print content data included in one template set, the contents of the print content data of all the pieces of object data in all the selected template data can be automatically set. Therefore, with a relatively small number of operation times, setting and management of the template data can be performed, thereby usability of the user being improved.

According to the present embodiment, the content of the print content data to be shared among the objects of the associated object ID group is set in S35, and the print contents set to respective associated object ID groups are recorded in the template set management data in S45. Accordingly, it becomes possible that the content of the print content data can be set on the side of the operation terminal 2 which executes the management data generating process, and it becomes unnecessary to execute a complicated setting of the print content data on the label printer 3 side.

Further, according to the present embodiment, the number of prints of each of the plurality of pieces of selected template data is set in S15, and the number of prints to be set for each piece of the selected template data is recorded in the template set management data. Accordingly, the number of prints of the print label corresponding to each piece of the selected template data can be set on the side of the operation terminal 2 which executes the management data generating process, and a troublesome operation of setting the number of prints on the label printer 3 becomes unnecessary.

According to the above-described embodiment, the label printer 3 receives newly configured template set management data, which is generated separately from the template data. Alternatively, according to the embodiment, the label printer 3 generates the template set management data and stores the same, which is retrieved when necessary. That is, the CPU 216 of the label printer 3 executes S105 to obtain the template set management data by receiving the same from the operation terminal 2, or retrieve the same from the memory 215. The template set management data stores the plurality of pieces of selected template data which have been arbitrarily selected from the plurality of pieces of template data which have been stored in advance in the memory 215, and the same-content associating data indicating the objects of the plurality of selected template data supposed to have the same print content data. Thereafter, the CPU 216 executes S105-S140 to control the conveyer 209 and the print head 205 based on the selected template data and the same-content associating data recorded in the obtained template set management data, thereby the print labels on which images corresponding to the plurality of selected templates are formed being created, respectively.

As described above, a set containing a plurality of different pieces of selected template data can be managed with a single piece of template set management data, and further, the objects sharing the same content among the plurality of pieces of selected template data can also be managed. As a result, the label printer 3 obtained the template set management data can grasp which ones of the plurality of pieces of the selected template data are used in the set, and what combination of the object data shares the same print content data. According to such a configuration, by setting the content once for each type of print content data for each set, the content of the print content data of all the pieces of object data in the selected template data can be automatically set, and the print labels corresponding to all the selected template can be automatically created. Accordingly, with less number of operations, the set of the template data can be managed, set, and printed, thereby usability being improved.

It is noted that aspects of the present disclosures need not be limited to the above-described illustrative embodiment, but various modifications could be realized without departing from the aspects of the disclosure. Such modifications will be described subsequently. In the following description on respective modifications, portions same as those in the above-described illustrative embodiment are assigned with the same reference numbers and description thereof will be omitted and description thereof will be omitted or simplified for brevity.

(1) Case where Template Set Management Data is Modified on Label Printer Side

According to the above-described embodiment, the template set management data in which the number of prints and the print content data have already been set is generated by the operation terminal 2 or the label printer 3, and the print label set is created based on the template set management data. For example, when the label printer 3 is located remotely from the operation terminal 2, and when, with use of existing template set management data, print label set corresponding to the number of prints or print content data which is not corresponding to the existing template set management data is to be generated, the label printer 3 may be configured to modify only the number of prints or the print content data.

Figure 7:
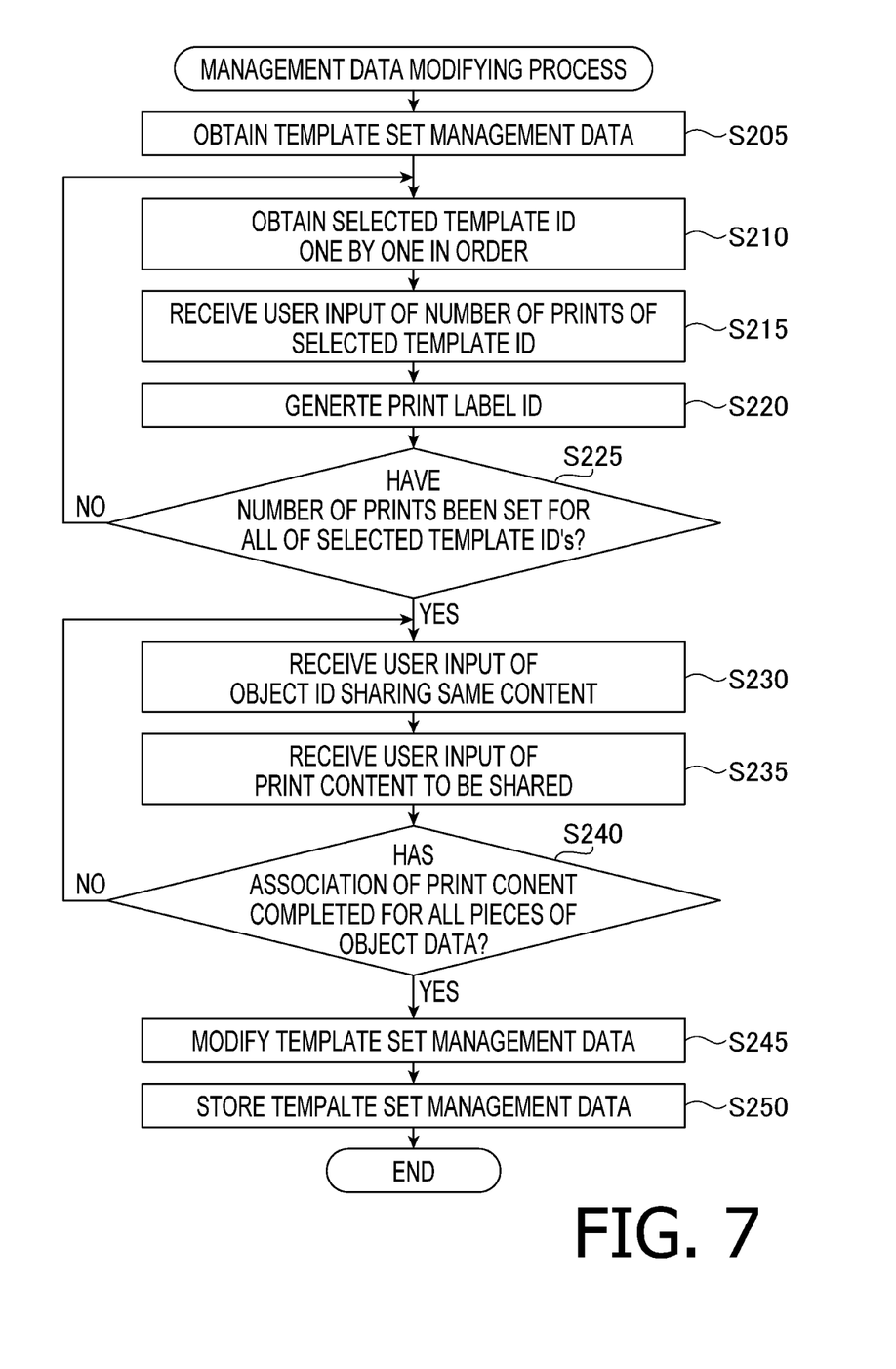
FIG. 7 is a flowchart illustrating a management data modifying process executed by the CPU of the label printer.

In order to realize a modifying process to modify the template set management data, the CPU 216 of the control circuit 202 of the label printer 3 may be configured to execute a management data modifying process, an example of which is show in FIG. 7. When a user operation on the label printer 3 side to modify the template set management data is performed, the management data modifying process shown in FIG. 7 is started.

In S205, the CPU 216 obtains target template set management data from the memory 215 to be modified. Alternatively, the CPU 216 may receive the target template set management data from the operation terminal 2.

In S210, the CPU 216 obtains, in order (e.g., in the order of numbers I, II, III, . . . ), one of selected template ID's recorded in the selected template data included in the template set management data obtained in S205.

Then, the CPU 216 proceeds to S215 and receives a user input of the number of prints of the selected template data obtained in S210. It is noted that the process of S215 is an example of a number-of-prints setting process.

The CPU 216 proceeds to S220 and generates the print label ID based on the selected template ID and the number of prints.

Next, the CPU 216 proceeds to S225 and determines whether the number of prints has been set to all the selected template ID's. When there remains the selected template ID to which the number of prints has not been set (S225: NO), the CPU 216 returns to S210 and repeats the similar process.

When it is determined that the number of prints has been set to all the selected template ID's (S225: YES), the CPU 216 proceeds so S230.

In S230, the CPU 216 receives a user input of all the object ID's corresponding to the objects sharing the same print content.

Next, in S235, the CPU 216 receives a user input of the print content data corresponding to the object ID's listed, in S230, in the associated object ID group. It is noted that the process of S235 is an example of a content setting process.

Then, the CPU 216 proceeds to S240 and has completed association of all the arbitrary object data included in all the selected templated data with any of the associated object ID groups. Where there remains the arbitrary object data which has not been associated with any of the associated object ID groups (S240: NO), the CPU 216 returns to S230 and the similar process is repeated for the new object ID group.

When the association has been completed for all the pieces of arbitrary object data (S240: YES), the CPU 216 proceeds to S245.

In S245, the CPU 216 modifies the template set management data based on the selected template data modified in S210-S240 and the same-content associating data.

Next, in S250, the CPU 216 stores the template set management data modified in S245 in the memory 215, and terminates the management data modifying process.

It is noted that the template set management data processed in the management data modifying process needs not be limited to one to which the number of prints and/or the print content data have been set in advance. That is, the template set management data processed in the management data modifying process may be one to which only the selected template ID is set and the number of prints or the print content data (or the same-content associating data) have not been set.

By executed the management data modifying process described above, the print label set having different number of prints or different print content data can be created in accordance with the print format defined by existing template set management data.

Further, according to the above-described modification, the print content shared among the plurality of pieces of object data indicated by the same-content associating data stored in the template set management data is set/modified on the label printer 3 side. Then, the label printer 3 prints the object data included in each piece of selected template data using the set/modified print content data. According to this configuration, each piece of print content data can be set/modified on the label printer 3 side. Therefore, even if the label printer 3 is remote from the operation terminal 2, it is possible to set or modify the print content data.

Further, according to the above-described modification, the number of prints of each piece of the selected template data recorded in the template set management data can be set/modified on the label printer 3 side. Then, the label printer 3 creates the print labels corresponding to each piece of selected template data in accordance with the set/modified number of prints. According to this configuration, the number of prints of the print labels corresponding to each selected template can be set/modified on the label printer 3 side. Therefore, even if the label printer 3 is remote from the operation terminal 2, it is possible to set or modify the number of prints. It is noted that FIG. 7 shows a case where both the number of prints of each labels and the print content data are modified. Although a flowchart will not be provided, it is apparent for person skilled in the art that the process shown in FIG. 7 can be modified such that only one of the number of prints of each labels and the print content data is modified.

(2) Case where Association is Made Based on Representative Template Data

According to the above-described embodiment, the same-content associating data is configured by the content of the associated object ID group in which the object ID's of the objects sharing the same print content are indicated. However, aspects of the present disclosures need not be limited to such a configuration. For example, one piece of selected template data containing the most pieces of object data associated with each other may be determined as representative template data. Then, it may be possible to generate the same-content associating data based on the representative template data.

Figure 8:
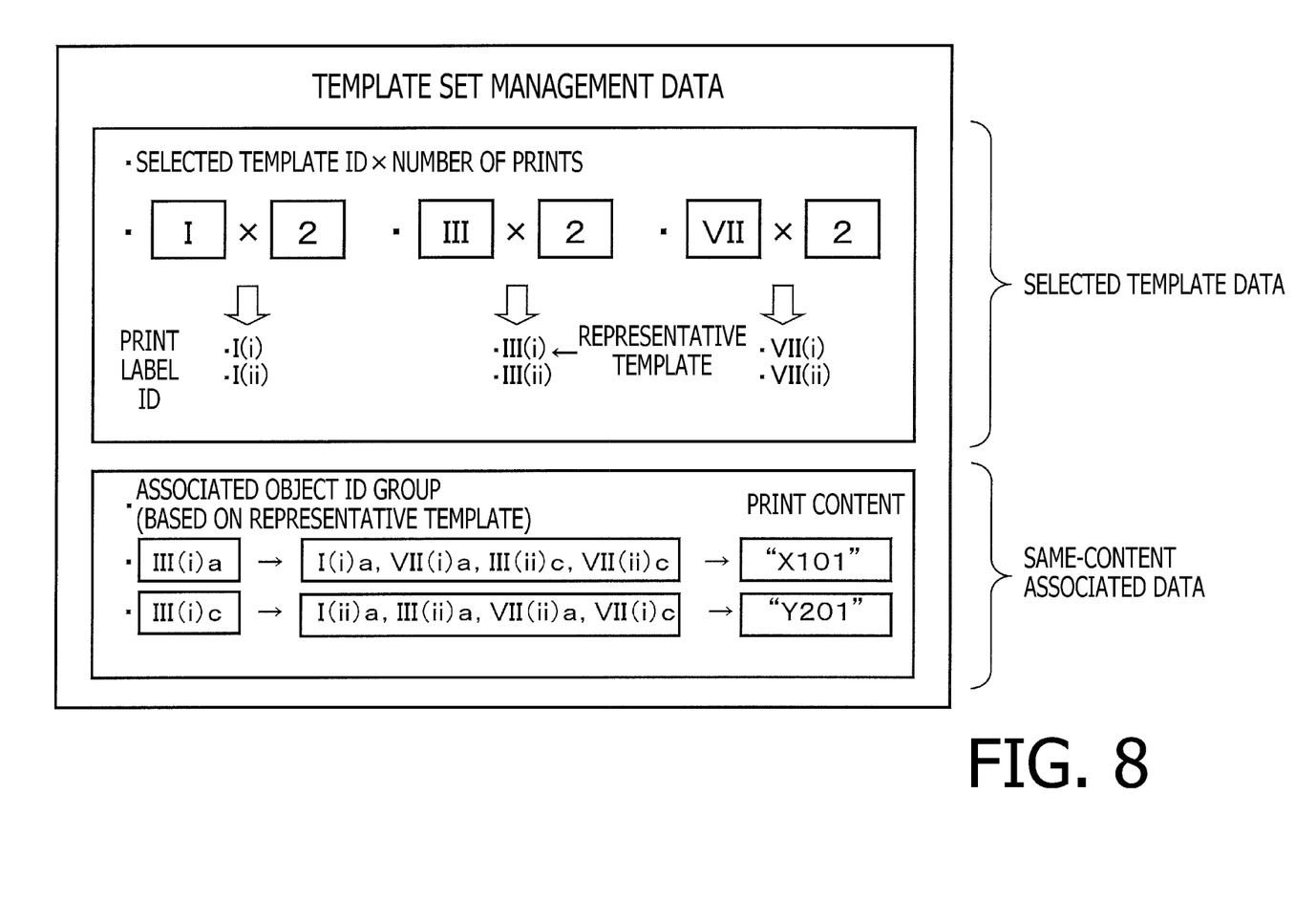
FIG. 8 schematically shows an example of template set management data, which is used to create the print label set shown in FIG. 2, with use of representative templates.

For example, a case where template set management data shown in FIG. 8 is used instead of the template set management data shown in FIG. 4 will be described. In this example shown in FIG. 8, the template data III (see FIG. 3) is set as the representative template. Further, the print content data corresponding to the object data "III(i)a" of the representative template data "III(i)" is "X101" and the print content data corresponding to the object data "III(i)c" of the representative template data "III(i)" is "Y101".

Regarding the objects of the other selected templates, one having the same contents as the object data "III(i)a" and ones having the same contents as the object data "III(ii)c" are indicated as the associated object groups, respectively. Accordingly, based on representative templates, the associated object ID groups can be identified, and the same-content associating data can be generated easily. Further, the same-content associating data can be generated based on concrete data of the identification information of the object data of the representative template.

If the number of pieces of data is too many and a single piece of representative template data cannot cover the print content data to be set to all the pieces of the selected template data, a plurality of pieces of (i.e., second, third, . . . ) representative template data may be used (not shown).

It is noted that, in the above description, terms "vertical", "parallel", "plane" and the like should not be interpreted too strictly. That is, the terms "vertical", "parallel", "planar" and the like are intended to allow designing and manufacturing tolerances and/or errors. Thus, the terms are intended to mean "substantially vertical", "substantially parallel", "substantially planar" and the like.

It is noted that, in the above description, when terms "identical", "equal", "different" and the like are used to express sizes or the like, they should not be interpreted too strictly. That is, the terms "identical", "equal", "different" and the like are intended to allow designing and manufacturing tolerances and/or errors. Thus, the terms are intended to mean "substantially identical", "substantially equal", "substantially different" and the like.

It should also be noted that, when values delimiting value ranges and serving as criteria, the terms "identical", "equal", "different" and the like should be interpreted to have strict meanings.

In the foregoing description, arrows indicated in drawings show examples of flowing directions of signals. It is noted that the arrows do not limit the flowing directions.

It is noted that flowcharts shown in FIGS. 5, 6 and 7 do not intended to limit aspect of the present disclosures (e.g., orders of processes/steps need not be limited to those shown in the drawings). That is, deletion, addition and/or change of execution steps can be incorporated therein without departing from aspects of the present disclosures.

Beside the above-described embodiment and modifications, further modifications and/or combinations of parts thereof may be realized within aspects of the present disclosures.

Although not shown, further modifications can be made to the above-described embodiment and modifications without departing from aspects of the present disclosures.

What is claimed is:

1. A non-transitory computer-readable recording medium for an operation terminal of a print system including the operation terminal and a printer communicatably connected with each other, the printer being provided with a conveyer configured to convey a printing medium, a template storage configured to store a first plurality of pieces of template data, each of the first plurality of pieces of template data containing object data defining a print format, a printing device configured to perform printing based on particular print content data and the print format defined by the object data, and a controller configured to control the conveyer and the printing device, the recording medium storing instructions which cause, when executed by the controller, the printer to perform:
a selection process of receiving a user input of selecting a second plurality of pieces of template data as selected template data from among the first plurality of pieces of template data stored, in advance, in the template storage;

an association process of generating same-content associating data indicating a third plurality of pieces of arbitrarily selected object data, included in the second plurality of pieces of selected template data, being associated with each other, the third plurality of pieces of arbitrarily selected object data being set with the particular print content;

a management process of generating template set management data configured to storing the second plurality of pieces of selected template data and the same-content associating data; and storing the template set management data in the template storage.

2. The non-transitory computer-readable recording medium according to claim 1, where the instructions further cause the controller to perform a content setting process allowing the user to input the particular content, the particular content being set to the second plurality of pieces of selected template data, and wherein, in the management process, the particular print content data set in the content setting process is recorded in the template set management data in correspondence with the same-content associating data.

3. The non-transitory computer-readable recording medium according to claim 1, wherein the instructions further cause the controller to perform a number of prints setting process of setting a number of prints of each piece of the second plurality of pieces of selected template data, and wherein the instructions further cause, in the management process, to record the number of prints seta in the number of prints setting process in the template set management data.

4. The non-transitory computer-readable recording medium according to claim 1, wherein the instructions further cause, in the association process, the controller to define representative template which one pieces of the second plurality of pieces of selected template data containing most number of pieces of object data associated by the same-content associating data among the second plurality of pieces of selected template data.

5. The non-transitory computer-readable recording medium according to claim 4, wherein the instructions further cause the controller to generate the same-content associating data referring to identification information of the object data included in the representative template data.

6. A printed matter creating device, comprising:

a conveyer configured to convey a printing medium;

a printing device configured to perform printing based on print data on the printing medium conveyed by the conveyer;

a template storage configured to store a first plurality of pieces of template data, each of the first plurality of pieces of template data including object data defining a print format, a particular print content being printed by the printing device in accordance with the print format defined by the object data; and a controller configured to control the conveyer and the printing device, wherein the controller is configured to perform:

an obtaining process of obtaining template set management data containing:

a second plurality of pieces of selected template data which are arbitrarily selected from the first plurality of pieces of template data which have been stored, in advance, in the template storage; and same-content associating data associating a third plurality of pieces of arbitrarily selected object data contained in the second plurality of pieces of selected template data with each other, the third plurality of pieces of arbitrarily selected object data being set with a same print content data; and a printed matter creating process of controlling the conveyer and the printing device based on the second plurality of pieces of selected template data and the same-content associating data contained in the template set management data obtained in the obtaining process to create a printed matter on which printing corresponding to each of the second plurality of pieces of selected template data is performed.

7. The printed matter creating device according to claim 6, wherein the controller further performs a content setting process of setting a content of the same print content shared among the third plurality of pieces of arbitrarily selected object data associated in accordance with the same-content associating data contained in the template set management data; and wherein the controller performs, in the printed matter creating process, printing in accordance with the print format defined by the third plurality of pieces of arbitrarily selected object data contained in the second plurality of pieces of selected template data and in accordance with the same print content set in the content setting process.

8. The printed matter creating device according to claim 6, wherein the controller further performs, in a number of prints setting process, setting of a number of prints of each of the second plurality of pieces of selected template data contained in the template set management data, and wherein the controller further creates the printed matter corresponding to the second plurality of pieces of selected template data in accordance with the number of prints set in the number of prints setting process.

9. A print system including an operation terminal and a printer communicatably connected with each other, one of the operation terminal and the printer comprising:

a storage configured to store a plurality of pieces of template data;

a user interface; and a controller, the controller being configured to:

receive a user input, through the user interface, of information indicating selected pieces of template data from among the plurality of pieces of template data stored in the storage as selected template data;

receive a user input, through the user interface, of a number of prints of a printed matter corresponding to each piece of the selected template data;

receive a user input, through the user interface, of information indicating a plurality of pieces of object data to which a same print content is to be set from among the plurality of pieces of object data contained in the selected template data;

receive a user input, through the user interface, of print content data which is to be shared by the plurality of pieces of object data as the same print content; and generate template set management data including same-content associating data indicating the selected pieces of object data and the print content data;

wherein, when the controller is of the operation terminal, the controller transmits the template set management data to the printer, a controller of the printer performing printing based on the template set management data transmitted from the controller of the operation terminal, and wherein, when the controller is of the printer, the controller performs printing based on the template set management data as generated.

10. The print system according to claim 9, wherein the controller of the printer is configured to modify at least one of the same-content associating data and the print content data.

\* \* \* \* \*

UNITED STATES PATENT AND TRADEMARK OFFICE
CERTIFICATE OF CORRECTION

PATENT NO. : 10,752,019 B2  
APPLICATION NO. : 16/362476  
DATED : August 25, 2020  
INVENTOR(S) : Feng Zhu Page 1 of 1

It is certified that error appears in the above-identified patent and that said Letters Patent is hereby corrected as shown below:

On the Title Page

At Column 2 In the ABSTRACT Line 8 should be corrected as follows:
input of selecting a plurality of pieces of template data from At Column 2 In the ABSTRACT Line 15 should be corrected as follows:
store the selected template data and the same-content In the Claims At Column 15 Line 12 of Claim 1 should be corrected as follows:
agement data configured to store the second plurality At Column 15, Lines 4-5 of Claim 4 should be corrected as follows:
process, the controller to define representative template data
which is one piece of the second plurality of pieces of Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*